(12) United States Patent  (10) Patent No.: US 10,697,649 B2
Bergqvist et al.  (45) Date of Patent: Jun. 30, 2020

(54) ELECTRONIC CONVERTER UNIT FOR RETROFITTING TO AN EXTERNAL PART OF A HOUSING OF A PUMP UNIT

(71) Applicant: Grundfos Holding A/S, Bjerringbro (DK)

(72) Inventors: René Stig Bergqvist, Regstrup (DK); Christian Wolf, Bjerringbro (DK); Jens Milthers, Støvring (DK)

(73) Assignee: Grundfos Holding A/S, Bjerringbro (DK)

( * ) Notice: Subject to any disclaimer, the term of this patent is extended or adjusted under 35 U.S.C. 154(b) by 0 days.

(21) Appl. No.: 15/532,238

(22) PCT Filed: Mar. 10, 2015

(86) PCT No.: PCT/EP2015/054980
§ 371 (c)(1),
(2) Date: Jun. 1, 2017

(87) PCT Pub. No.: WO2016/087056
PCT Pub. Date: Jun. 9, 2016

(65) Prior Publication Data
US 2017/0272844 A1  Sep. 21, 2017

(30) Foreign Application Priority Data
Dec. 3, 2014 (WO) ............... PCT/EP2014/076416

(51) Int. Cl.
*F24D 19/10* (2006.01)
*F04D 13/06* (2006.01)
(Continued)

(52) U.S. Cl.
CPC ..... *F24D 19/1012* (2013.01); *F04D 13/0686* (2013.01); *F04D 15/0066* (2013.01);
(Continued)

(58) Field of Classification Search
CPC ............. F24D 19/1012; F24D 19/1015; F24D 19/1024; F24D 19/1048; F24D 3/10;
(Continued)

(56) References Cited

U.S. PATENT DOCUMENTS

| 6,629,645 | B2 * | 10/2003 | Mountford | G05D 23/1393 236/12.12 |
| 7,012,546 | B1 * | 3/2006 | Zigdon | H04B 1/707 340/870.01 |
| 9,213,139 | B2 * | 12/2015 | Cok | G02B 6/138 |
| 9,330,560 | B2 * | 5/2016 | Lawson | G08C 17/02 |
| 9,695,827 | B2 * | 7/2017 | Araki | F01P 5/12 |
| 9,841,644 | B2 * | 12/2017 | Park | G02F 1/13439 |

(Continued)

FOREIGN PATENT DOCUMENTS

| CN | 101641522 A | 2/2010 |
| EP | 0 355 255 A2 | 2/1990 |

(Continued)

*Primary Examiner* — Franklin D Balseca
(74) *Attorney, Agent, or Firm* — McGlew and Tuttle, P.C.

(57) ABSTRACT

An electronic converter unit for retrofitting to an external part of a housing of a pump unit is described. The housing comprises a light source for emitting light to display an operating status of the pump unit. The electronic converter unit comprises: a photo detector for measuring light emitted from the light source of the pump unit, a converter unit for converting optical signals to electrical signals, and transmitting means for wirelessly transmitting the electrical signals to an external communication unit.

32 Claims, 5 Drawing Sheets

(51) Int. Cl.
   *F04D 15/00* (2006.01)
   *F24D 3/10* (2006.01)
   *H04Q 9/00* (2006.01)

(52) U.S. Cl.
   CPC ............ *F04D 15/0088* (2013.01); *F24D 3/10* (2013.01); *F24D 19/1015* (2013.01); *F24D 19/1024* (2013.01); *F24D 19/1048* (2013.01); *H04Q 9/00* (2013.01); *H04Q 2209/00* (2013.01); *H04Q 2209/40* (2013.01); *Y02B 30/745* (2013.01)

(58) Field of Classification Search
   CPC ............ F04D 13/0686; F04D 15/0066; F04D 15/0088; G08B 5/228; H04Q 9/00; H04Q 2209/00; H04Q 2209/10; H04Q 2209/40; H04Q 2209/43; H04Q 2209/60; Y02B 30/745
   See application file for complete search history.

(56) References Cited

U.S. PATENT DOCUMENTS

| | | |
|---|---|---|
| 2005/0054292 A1 | 3/2005 | Janusz et al. |
| 2005/0129535 A1 | 6/2005 | Beyer et al. |
| 2013/0051024 A1* | 2/2013 | Amit ............... H04B 10/40 362/259 |
| 2014/0028462 A1 | 1/2014 | Lawson |
| 2015/0071649 A1* | 3/2015 | Lee ............... H04B 10/40 398/135 |

FOREIGN PATENT DOCUMENTS

| | | |
|---|---|---|
| EP | 146 231 A2 | 10/2001 |
| EP | 1 321 912 A1 | 6/2003 |
| EP | 2 778 423 A1 | 9/2014 |
| WO | 2013/041616 A1 | 3/2013 |
| WO | 2013/117401 A2 | 8/2013 |
| WO | WO-2015055715 A1 * | 4/2015 ........... A61B 5/0015 |

* cited by examiner

ELECTRONIC CONVERTER UNIT FOR RETROFITTING TO AN EXTERNAL PART OF A HOUSING OF A PUMP UNIT

FIELD OF THE INVENTION

The present invention relates to an electronic converter unit for retrofitting to an external part of a housing of a pump unit, such as a centrifugal pump. The invention further relates to a kit of parts comprising a pump unit and an electronic converter unit. The invention additionally relates to a system comprising a pump unit, an electronic converter unit, and an external communication device, such as a smart phone. Finally, the invention relates to a method for checking the operating status of a pump unit on an external communication unit.

BACKGROUND OF THE INVENTION

Many modern pump systems are provided with various types of controls in order to control pump units in specific ways. Circulation pumps are often intended to deliver a specific head and flow rate at given circumstances in order to meet particular requirements. To meet the different requirements, the pump units may be controlled according to different control patterns by changing one or more drive parameters. This may done by the user of the pump by use of input means provided at the pump itself, e.g. via an interface, such as a touch screen, at the pump unit. However, providing a pump unit with a display or a touch screen adds costs to the production price of the pump unit and thus also to the purchase price of the end consumer. Further, it entails a security risk, if anybody can gain access to the control system and to control the system to drive the pump unit at erroneous drive conditions.

EP 1 321 912 discloses a pump unit with a control or regulating device for controlling or regulating a drive of the pump, wherein the device has a light source for emitting light, which can be used for the transmission of data to a reader device.

WO 2013/041616 discloses a pump unit having an electrical drive motor and a control device for controlling the drive motor.

WO 2013/117401 discloses an electric motor, which is provided with a signal device for indicating at least two different operating states. For this purpose, the signal device has six light-emitting diodes, which are connected to flash mutually offset in time from one another, when the motor is running, so that they represent the rotary motion of the motor.

While a simple diode display may provide a simple visual indication to a user, e.g. green light for correct operating conditions and red light for faulty operating conditions, it is difficult to extract more detailed information about the operating condition of the pump. Further, the pump unit is usually provided with an energy-saving switch-mode converter or power supply, and switch-mode noise may thus influence external instruments.

SUMMARY OF THE INVENTION

It is an object of the invention to obtain new devices, systems, and methods, which overcome or ameliorate at least one of the disadvantages of the prior art or which provide a useful alternative.

According to a first aspect, the invention provides an electronic converter unit for a pump unit, wherein the pump unit includes a housing, which comprises a signal source for emitting a signal, wherein the electronic converter unit comprises: a signal detector for measuring the signal emitted from the signal source of the pump unit, and wherein the electronic converter unit is adapted to be detachably coupled to the pump unit and in that the electronic converter unit further comprises:

a converter unit for converting said signals to electrical signals, and transmitting means for transmitting the electrical signals to an external communication unit.

In an advantageous embodiment, the signal source is a light source, and wherein the signal detector is a photo detector for measuring the light emitted from the light source of the pump, and wherein the converter unit is adapted to converting optical signals to electrical signals. However, according to another embodiment, the signal source may also be a sound generator, e.g. a loudspeaker, and the signal detector being a microphone. Further, it is possible to use electrical communication, such as RFID or NFC between the pump and the electronic converter unit.

The external communication unit is preferably a handheld communication device, such as a smart phone.

The invention allows a user or service worker having a handheld communication device, such as a smart phone, to read out information about the operating status from the pump unit. By allowing a converter device and a handheld communication device to access to the pump unit, the necessity of having an expensive user interface provided on the pump unit is further eliminated. Thereby, the production price for the manufacturer and the purchase price for the end consumer may be lowered. In this case the electronic converter unit communicates unidirectionally with the pump unit, and unidirectionally or bidirectionally with the handheld device.

Additionally, if the converter device also acts to provide access to control of the pump unit, the invention provides a secure access to the pump unit, since the user both have to have an electronic converter unit and a handheld communication device with the correct app installed on the handheld communication device. Further, by removing the option to program the pump unit via a control panel, the security of the system is improved and ensures that the pump unit cannot be tampered with or reprogrammed without proper permission. In this case the electronic converter unit communicates bidirectionally with the pump unit, and unidirectionally or bidirectionally with the handheld device.

It is noted that the electronic converter unit is retrofitted to the pump unit and accordingly is a separate device. Accordingly, the electronic converter unit may preferably be detachably coupled to the housing of the pump unit.

The status or operational parameters that can be read out from the pump unit into the electronic converter unit are parameters, such as flow (m3/hour), pressure (metres or bar), electrical current (ampere) used by the motor of the pump or the rotational speed of the rotor and impeller (RPM).

The term "handheld communication device" may cover a number of portable devices of a limited size and may for instance be chosen from the group consisting of: a smart phone, a tablet, a PDA, and a wearable device, such as a smart watch.

The pump unit preferably comprises a pump and an electrical motor. Further, the pump unit may comprise a control box. The pump and electrical motor may be integrated in a common housing, or be separated into a pump housing and a motor housing. The control box (also called terminal box or frontend) may be integrated into one of the housings or it may be a separate unit. The control box may thus be an external unit having a separate housing, and it is recognised that the electronic converter unit may be retrofitted to the housing of the control box. The control box may be arranged at any position of the pump, e.g. in the front or at the side of the pump unit. The control box may include electronics for controlling the pump unit.

The electronic converter unit is adapted to be detachably coupled to the housing of the pump unit. Accordingly, the electronic converter unit may be easily be attached and detached from the housing of the pump unit and be used for reading out the operating status from a plurality of pump units.

The converter device is advantageously adapted to transmit the electrical signals as an infrared signal or as a radio signal, such as GSM, CDMA, 3G, 4G, and Bluetooth®.

In one advantageous embodiment, the electronic converter unit is provided with a housing having an aperture, and wherein the photo detector is arranged within the housing behind the aperture. Accordingly, the photo detector of the electronic converter unit may be arranged so that a minimum of surrounding light enters the housing an affects the detection of light emitted from the pump unit.

The photo detector may be arranged in a range of 0.5 mm to 5 mm from the aperture, advantageously in a range of 1 mm to 2.5 mm from the aperture.

The aperture may advantageously be provided with an optical transparent cover, such as glass, artificial glass or plastic, i.e. a window or the like.

In a preferred embodiment, the aperture is further provided with a sheet or layer of conductive material, the sheet having a number of apertures. The apertures ensure that light may pass the sheet or layer of conductive material and be detected by the photo detector.

In another preferred embodiment, the sheet or layer of conductive material is may be an opaque sheet with an aperture for the light to enter, or it may be a mesh structure. Accordingly, the sheet or layer of conductive material may effectively function as a Faraday cage, which allows light to enter but not electrical noise. Accordingly, the electronic converter unit is shielded against interference from a switchmode converter of the pump unit. The conductive material may for instance be made of metal, such as copper or brass, but any conductive material is in principle applicable.

The sheet or layer must provide a closed shielded surface towards the incoming signals incorporating information and electrical noise.

In an advantageous embodiment, a pitch size of the mesh is larger than a wavelength of the transmitted light but smaller than a wavelength of electric noise emitted from the nearby electronic converter unit. The openings in the mesh has to be large enough for light at the wavelength of the light source to be able to be detected by the photo sensor, but small enough to provide an efficient shielding to electric noise.

In one embodiment, the conductive material is integrated into the optical transparent cover. In an alternative embodiment, the optical transparent cover and the sheet of conductive material are provided as two separate layers. Alternatively, the conductive material may be in-moulded or embedded within a transparent cover, i.e. a cover that is transparent to the wavelength of the emitted light from the light sources of the pump unit.

In one embodiment, the conductive material is connected to electrical ground.

In another preferred embodiment, the housing of the electronic converter unit is covered by a conductive material, and the sheet of conductive material is grounded to said housing. The entire interior surface of the housing may for instance be covered by a conductive material, and the aperture be provided with the sheet or mesh of conductive material. Thus, the housing may provide a large ground plane. The conductive material of the housing may also be provided as a mesh structure, thus providing a large Faraday cage.

The electronic circuitry of the electronic converter unit may be grounded to the same ground as the conductive layer of the aperture and the housing. Alternatively, the circuitry may be grounded to a separate ground.

The electronic converter unit is advantageously provided with attachment means for attaching the electronic converter unit to the housing of the pump unit. The attachment means may for instance be chosen from the group of: mechanical fasteners, magnetic fasteners, and adhesive fasteners. The adhesive fastener may for instance be a double-adhesive tape, such as a double-adhesive tape having a layer of foam cells, e.g. acrylic based foam cells. The adhesive is preferably releasable, such that the electronic converter unit may easily be removed from the housing of the pump unit.

In an advantageous embodiment, the fastening means are adapted to align the aperture of the electronic converter unit with the light source of the pump unit. Accordingly, the fastening means may provide an easy relative alignment between the electronic converter unit and the pump unit in order to ensure an efficient readout of light emitted from the pump unit.

In another advantageous embodiment, the electronic converter unit comprises an electronic signal amplification circuit, and optionally further comprises means for shutting off the unit or lowering its energy consumption, if a communication idle-time-limit has been reached.

The invention also provides a pump unit, which includes a housing provided with a signal source for emitting a signal, advantageously indicative of an operating status of the pump, wherein the pump via said signal source is adapted to communicate with an electronic converter unit, which may be detachably coupled to the pump. The signal source may be specially designed for communicating with the electronic converter unit, e.g. having no other purpose.

In an advantageous embodiment, the pump is adapted to communicate with the electronic converter unit via said signal source in near field communication only. Accordingly, the pump may be adapted to communicate with the electronic converter unit only when it is attached to the housing of the pump, or at least arranged in near vicinity of the pump.

In a second aspect, the invention provides a kit of parts comprising a pump unit and an electronic converter unit according to any of the aforementioned embodiments, wherein the pump unit comprises a housing and a signal source, advantageously a light source, for emitting a signal, advantageously light, and further advantageously to display or communicate an operating status of the pump unit, and wherein the electronic converter unit is adapted to be retrofitted to an external part of the housing of the pump unit.

Advantageously, the invention provides a kit of parts comprising a pump unit and an electronic converter unit according to any of the aforementioned embodiments, wherein the pump unit comprises a housing and a light source for emitting light to display an operating status of the pump unit, and wherein the electronic converter unit is adapted to be retrofitted to an external part of the housing of the pump unit.

The light source is accessible from the housing of the pump unit and provides an optical signal indicative of the operating condition of the pump unit.

While a simple diode display may provide a simple visual indication to a user, e.g. green light for correct operating conditions and red light for faulty operating conditions, it is difficult to extract more detailed information about the operating condition of the pump. The invention provides a simple system, where a retrofitted device may be used for extracting such information from a simple light display, such as a diode display comprising only a limited number of diodes. Thereby, the necessity of having an expensive user interface or display provided on the unit is eliminated. Thereby, the production price and the purchase price for the end consumer may be lowered. The optical signal may be provided as a simple binary signal or the like.

The pump unit may comprise an electric motor and at least one rotating shaft. The pump unit may display an operational state of the pump unit by use of the light source. The operational state may comprise information about the electric motor and the at least one rotating shaft, e.g. the current rotational speed of the shaft.

The pump unit may further be provided with a receiver for receiving instructions from the electronic converter unit, and wherein the electronic converter unit is provided with a transmitter for transmitting instructions to the pump unit. Accordingly, the converter unit may provide two-way communication and act as an intermediate communication device, which enables an external communication device to receive and transmit information between the external communication device and the pump unit and inter alia to control the pump unit. This provides a highly secure system, where a user can only access the working parameters of the pump system, if the user both have to have an electronic converter unit and a handheld communication device with the correct app installed on the handheld communication device.

The pump unit may comprise an electronic switch-mode converter or power supply, e.g. operating in the frequency range of 100 kHz to 200 kHz.

In a third aspect, the invention provides a system for checking the operating status of a pump unit, wherein the system comprises a pump unit, an external communication unit, and an electronic converter unit, wherein the pump unit comprises a housing and a signal source, advantageously a light source, for emitting a signal, advantageously light, and further advantageously to display an operating status of the pump unit, and wherein the electronic converter unit is adapted to be retrofitted to an external part of the housing of the pump unit and adapted to convert signals from the pump unit to electrical signals and to transmit the electrical signals to the external communication unit, and wherein the external communication unit is adapted to receive and process electrical signals sent from the electronic converter unit so as to display the operating status of the pump unit on a display of the external communication device.

In the third aspect, the invention advantageously provides a system for checking the operating status of a pump unit, wherein the system comprises a pump unit, an external communication unit, and an electronic converter unit according to any of the aforementioned embodiments, wherein the pump unit comprises a housing and a light source for emitting light to display an operating status of the pump unit, and wherein the electronic converter unit is adapted to be retrofitted to an external part of the housing of the pump unit, and wherein the external communication unit is adapted to receive and process electrical signals sent from the electronic converter unit so as to display the operating status of the pump unit on a display of the external communication device.

In other words, the external communication device may be provided with a receiver for receiving electrical signals sent from the electronic converter unit, and a processing unit for processing the electrical signals received.

The external communication unit is advantageously a handheld communication device, such as a smart device, e.g. a smart phone.

In a preferred embodiment, the handheld communication device has an app installed and running on the handheld communication device for processing the electrical signal received from the electronic converter unit.

In one advantageous embodiment, the external communication device is further adapted to control the pump unit via the electronic converter unit. Accordingly, the electronic converter unit may provide a two-way communication between an external communication device and a pump unit.

In a fourth aspect, the invention provides a method for checking the operating status of a pump unit with an external communication unit, wherein the method comprises the steps of:

a) providing a pump unit comprising a housing and a light source for emitting light to display an operating status of the pump unit, b) arranging an electronic converter unit for converting an optical data output from the light source of the pump unit to an electrical data signal so that a photo detector of the electronic converter unit is aligned with the light source of the pump unit, c) the pump unit emitting the optical data output via the light source in order to display the operating status of the pump unit, d) the electronic converter unit detecting the optical data output via the photo detector, e) the electronic converter unit converting the detected optical data output to an electrical data signal, f) the electronic converter unit transmitting the electrical data signal to the external communication device, g) the external communication device processing the electrical data signal in order to extract the operating status of the pump unit, and h) the external communication device displaying the operating status of the pump unit on a display of the external communication device.

Thereby, the invention provides a simple method of reading out and displaying the operating status of a pump unit via an external communication device running a software application (an app). Thus, the pump unit does not need to be provided with a large display screen.

As previously mentioned, the invention may also more broadly refer to a general signal source and a corresponding detector, e.g. a sound generator and microphone or an RFID or NFC signal source and an RFID or NFC receiver.

In an advantageous embodiment, the pump unit in a subsequent step is controlled by:

i) the external communication device sending instructions to the pump unit, and j) the pump unit setting driving conditions of the pump unit based on said instructions.

Accordingly, a two-way communication is established between the external communication device and the pump unit, which may thus be controlled or operational parameters may be changed via the app on the external communication device.

Preferably, the instructions are sent to the electronic converter unit, which converts the instructions and emits the converted instructions via a light source of the electronic converter unit, which in turn is received by a photo detector on the pump unit. Thus, the electronic converter unit provides the two-way communication. Accordingly, a highly secure system is provided, where the settings of the pump unit may only be changed, if the user has an electronic converter unit and is running the correct app on the external communication device.

In one embodiment, the operating status received from the electronic converter unit and displayed on the handheld device is chosen from the group of: a flow information, a speed information, an electrical current information or a pressure information relating to the liquid flowing in pipes connected to the pump, a temperature of the liquid, a rotational speed of a shaft of the pump unit, and wherein said information is optionally used by an app in the handheld device to guide a service technician to balance said liquid flow or pressure in a heating system comprising a plurality of radiators or heat radiating pipes.

In a first additional aspect, the invention provides an electronic converter unit for a pump unit, wherein the pump unit includes a housing and comprises a communication system for transmitting an operating status of the pump unit, wherein the communication system comprises an RFID or near-field communication (NFC) unit, and wherein the electronic converter unit is adapted to be retrofitted to an external part of the housing of the pump unit and in that the electronic converter unit comprises:
- a RFID or near-field communication receiver,
- a converter unit for converting RFID or NFC signals to electrical signals, and
- transmitting means for transmitting the electrical signals to an external communication unit.

The only difference between the first aspect and the first additional aspect is that the technology for the retrofitted electronic converter is based on RFID or NFC technology instead of an optical readout or display from the pump unit. All the afore-mentioned embodiments are also applicable to the first additional aspect.

According to a second additional aspect, the invention provides a kit of parts comprising a pump unit and an electronic converter unit to be retrofitted to the housing of the pump unit, and wherein the communication is based on RFID or NFC technology.

According to a third additional aspect, the invention provides a system for checking the operating status of a pump unit, wherein the system comprises a pump unit, an external communication unit, and an electronic converter unit, wherein
- the pump unit comprises a housing and a communication system for transmitting an operating status of the pump unit, wherein the communication system comprises an RFID or near-field communication (NFC) unit, and wherein
- the electronic converter unit is adapted to be retrofitted to an external part of the housing of the pump unit and adapted to convert RFID or NFC signals from the pump unit to electrical signals and to transmit the electrical signals to the external communication unit, and wherein
- the external communication unit is adapted to receive and process electrical signals sent from the electronic converter unit so as to display the operating status of the pump unit on a display of the external communication device.

The communication between the pump unit and the electronic converter unit may for instance be based on induction coils or loop antennas.

The systems utilising optical readout and the RFID or NFC based communication are linked by a common inventive concept in that the display of the pump unit may be simplified and in that a retrofitted electronic converter unit is utilised to convert the output from the pump unit, which may also provide additional improved security aspects.

In broader terms, the invention provides an electronic converter unit for a pump unit, wherein the pump unit includes a housing and comprises a communication system for transmitting an operating status of the pump unit, and wherein the electronic converter unit is adapted to be retrofitted to an external part of the housing of the pump unit and in that the electronic converter unit and comprises:
- a proximity detector,
- a converter unit for converting transmitted signals from the pump unit to electrical signals, and
- transmitting means for transmitting the electrical signals to an external communication unit.

Accordingly, it is seen that the communication system of the pump unit may comprise a light source, a RFID transmitter, or and NFC transmitter. The proximity detector of the electronic converter unit may for instance be a photo detector, a RFID receiver or an NFC receiver.

BRIEF DESCRIPTION OF THE FIGURES

The invention is explained in detail below with reference to embodiments shown in the drawings, in which.

DETAILED DESCRIPTION OF THE INVENTION

Figure 1:
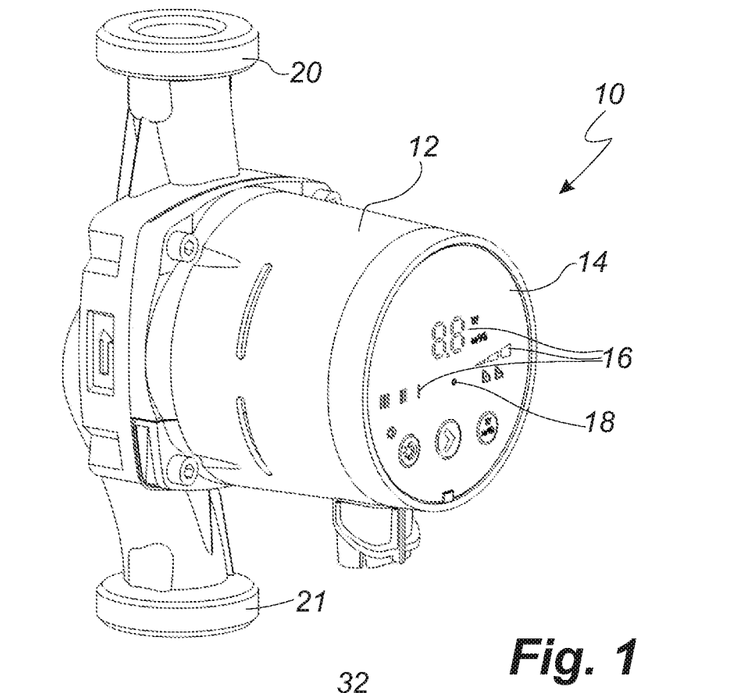
FIG. 1 shows a perspective view of a pump unit.

FIG. 1 shows a perspective view of a pump unit 10 or pump assembly. The pump unit comprises a housing 12 or terminal box, which has a front end 14 or display, which may be provided with a number of display units 16, which may provide a simple indication of an operating status of the pump unit. However, the invention also makes it possible to simplify the front end 14 even further, as the necessity of having a display is alleviated, whereby the production cost and thereby the price for the end-consumer may be lowered considerably. Accordingly, the front end 14 may be provided without the display units 16. The front end 14 is further provided with a light source 18, e.g. in form of a single photo diode or a plurality of photo diodes. The pump unit 10 is under operation installed in a pipe system via the pipe flanges 20, 21.

The housing 12 or terminal box of the pump unit 10 houses an electrical motor and a drive shaft as well as control circuitry of the pump unit 10. In the depicted embodiment, the electric motor and pump parts are integrated into a common housing. However, in an alternative embodiment, the electrical motor and the pump may be arranged in separate housings. The control circuitry may control the light source 18 to emit light to display an operating status of the pump unit 10, whereby more detailed information about the operating status may be read out from the pump unit 10, e.g. as binary optical signals.

The front end 14 of the pump unit 10 may further be provided with one or more buttons, which may be pressed in order to initialise a sequence, where the light source 18 is brought to emit light in order to display the operating status of the pump unit 10.

Figure 2:
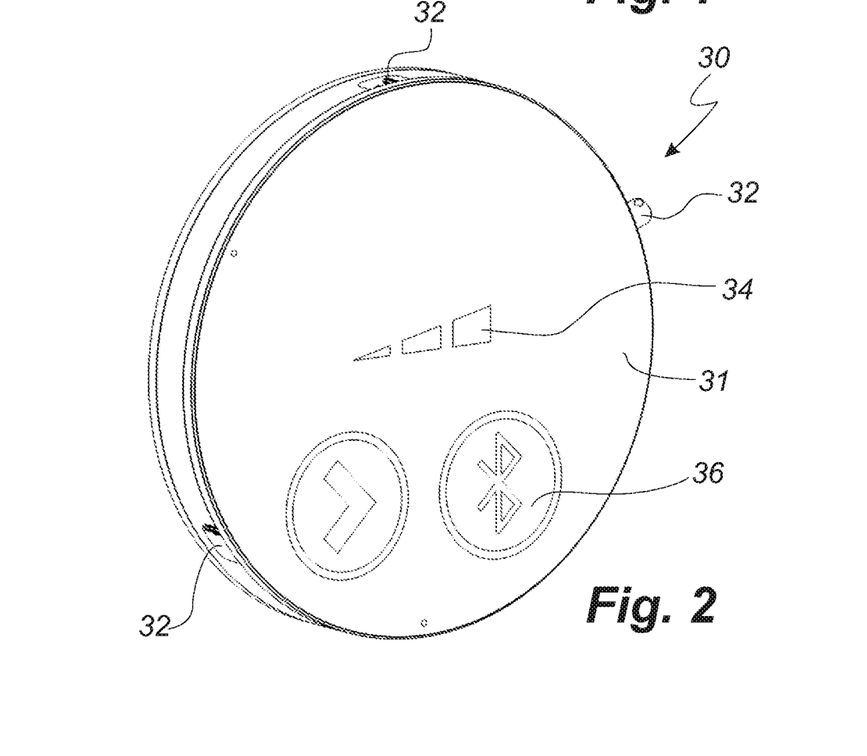
FIG. 2 shows a perspective view of an electronic converter unit according to the invention.

FIG. 2 shows a perspective view of an electronic converter unit 30 according to the invention. The electronic converter unit 30 comprises a housing 31, which houses the electronic circuitry of the electronic converter unit 30. The electronic converter unit 30 is adapted to be attached or retrofitted to an external part of the housing 12 of the pump unit 10, preferably adapted to being detachably coupled to the housing 12 of the pump unit 10. The electronic converter unit 30 is shown as a circular shaped device, but can also have the shape of a rectangular box. For reasons of handiness, the outer contour of the unit 30 is smaller than the contour of the front end 14.

The electronic converter unit 10 comprises a photo detector (not shown in FIG. 2) for detecting light emitted from the light source 18 of the pump unit 10, and which is arranged on or near a side of the electronic converter unit 30, which when attached to the housing 12 of the pump unit 10 faces towards the housing 12 of the pump unit 10.

The electronic converter unit 30 may further comprise a number of attachment parts 32, e.g. in form of retractable mechanical fasteners (not shown in FIG. 2). A front end of the electronic converter unit 30 may further be provided with an indicator or display 34, e.g. for giving an indication of a signal strength of the measured optical signal emitted from the light source 18 of the pump unit 10. The display 34 may thus provide a visual feedback to a user providing information about the alignment of the photo detector relative to the light source 18 of the pump unit 10.

In one embodiment, the front end 14 does not contain the light source 18. Instead, display units 16, i.e. segmented light emitting diodes, act as the signal source. The segments can be turned on or off in a predetermined pattern that can be read and interpreted by the electronic converter unit 30.

The electronic converter unit 30 is further provided with a communication unit for converting the detected optical signal to an electrical signal, such as infrared or a radio signal, e.g. based on GSM, CDMA, 3G, 4G, and Bluetooth® 36.

The front end of the electronic converter unit 30 may be provided with one or more buttons to initialise a sequence, where the electronic converter unit 30 detects optical signals emitted from the light source 18 of the pump unit 10 and converts the optical signals to electrical signals and transmits the electrical signals to an external communication unit, such as a smart phone.

Figure 3:
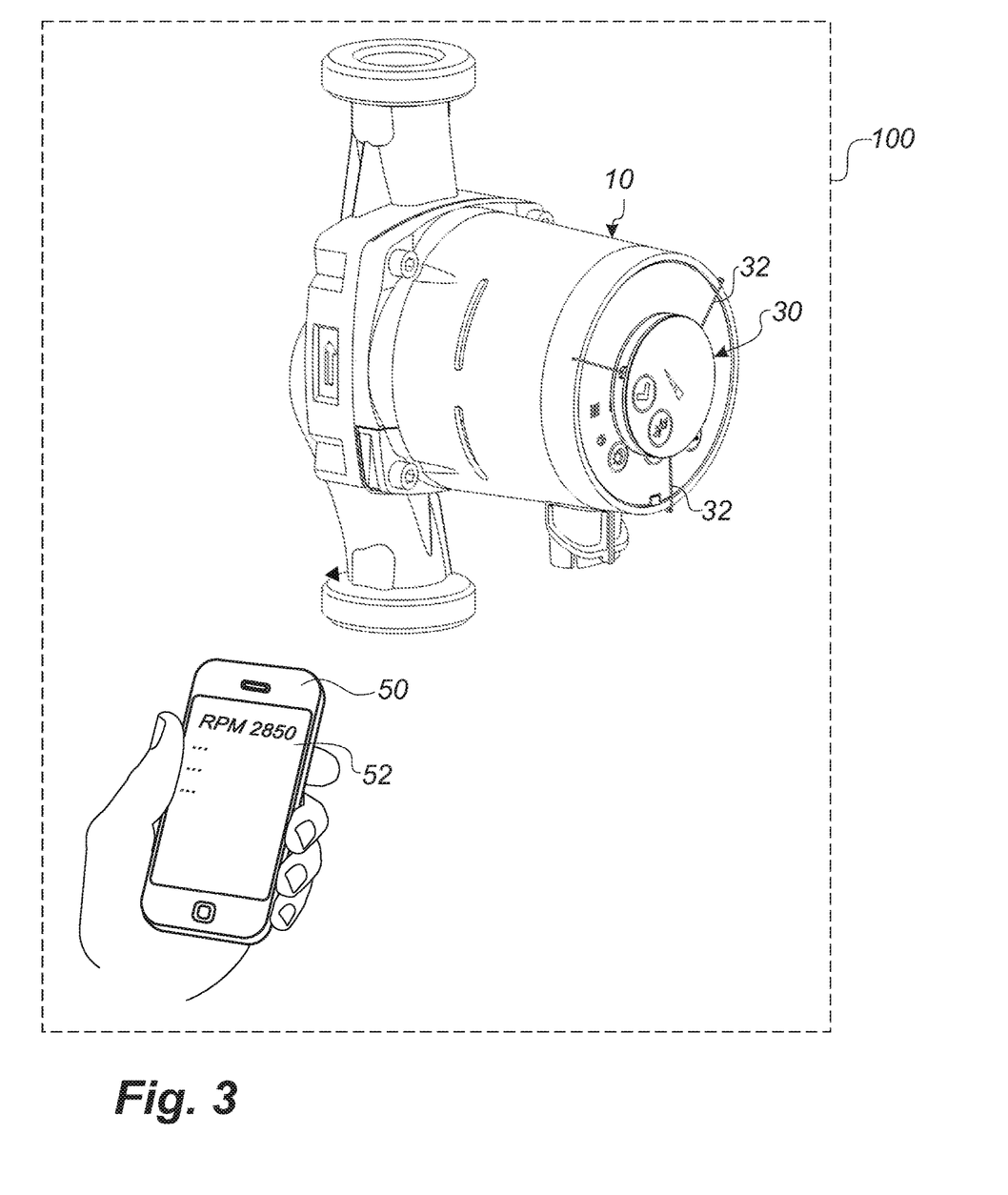
FIG. 3 shows a perspective view of the electronic converter unit retrofitted to an exterior part of a housing of the pump unit.

FIG. 3 shows a system 100 for checking the operating status of a pump unit 10. The system 10 comprises the afore-mentioned pump unit 10 and the electronic converter unit 30. The electronic converter unit 30 is here shown attached to the front end 14 of the housing 12 of the pump unit 10, such that the photo detector of the electronic converter unit 30 is aligned with the light source 18 of the pump unit 10. The electronic converter unit 10 is attached to the front end 14 of the pump unit 10 by use of mechanical fasteners 32, which are connected to sides of the housing 12 of the pump unit 10.

The electronic converter unit 10 detects the optical signals emitted from the pump unit 10 and converts them to radio signals, which are transmitted to an external communication unit 50 in form of a smart phone having a display 52. The smart phone 50 comprises an app, which is installed and running on the smart phone 50. The smart phone 50 and app are adapted to receive and process the radio signals sent from the electronic converter unit 30 so as to display the operating status of the pump unit 10 on the display 52 of the smart phone 50. The app may further be provided with a function to control the pump unit by setting the operating or drive parameters of the pump unit 10. The smart phone 50 may send the control instructions via the electronic converter unit 30.

FIGS. 8a-d show an alternative design for an electronic converter unit 30' for use in the invention, where the electronic converter unit 30' is shaped as an elongated unit. The electronic converter unit 30' comprises the same features as the electronic converter unit shown in FIG. 2. Accordingly, only the differences between the two embodiments are described in the following. Similar to the embodiment of FIG. 2, the electronic converter unit 30' comprises a housing 31', which houses the electronic circuitry of the electronic converter unit 30'. A front end of the electronic converter unit 30' may further be provided with an indicator or display 34', e.g. for giving an indication of a signal strength of the measured optical signal emitted from the light source 18 of the pump unit 10. The display 34' may thus provide a visual feedback to a user providing information about the alignment of the photo detector relative to the light source 18 of the pump unit 10.

Figure 8A:
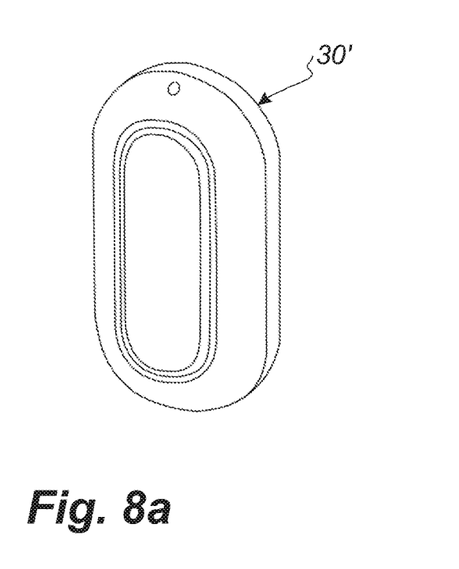
FIGS. 8a-d show perspective views of an alternative design for the electronic converter unit according to the invention.
Figure 8B:
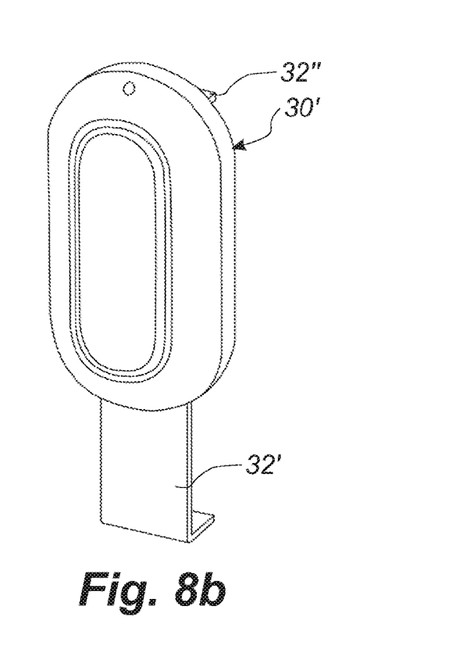
Figure 8C:
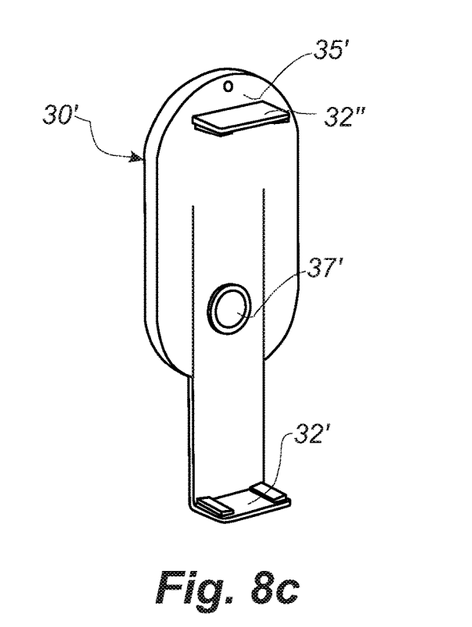

The electronic converter unit 30' comprises a first mechanical fastener 32', which may advantageously be slidable engaged with a main part of the electronic converter unit and may be extended from a first end of the electronic converter unit 30'. The electronic converter unit 30' further comprises a second mechanical fastener 32" at a second end of the unit 30'. The distance between the two mechanical fasteners 32', 32" may be varied so that they can mechanical engage sides of the frontend of the pump unit 10. The electronic converter unit 30' may further be designed such that the first mechanical fastener 32', when arranged in a closed state, covers and protects an aperture (e.g. a window or a condensing lens) in front of a photo detector of the electronic converter unit, and so that the aperture is exposed, when the first mechanical fastener 32' extends from the main body of the unit 30' (as seen in FIG. 8c). The mechanical fasteners 32' and 32" may be provided with small rubber pads, placed in the area where they engage with the pump housing. In this way the electronic converter unit 30 is mechanically better fixated to the pump housing and accommodate the shape of the housing.

Figure 8D:
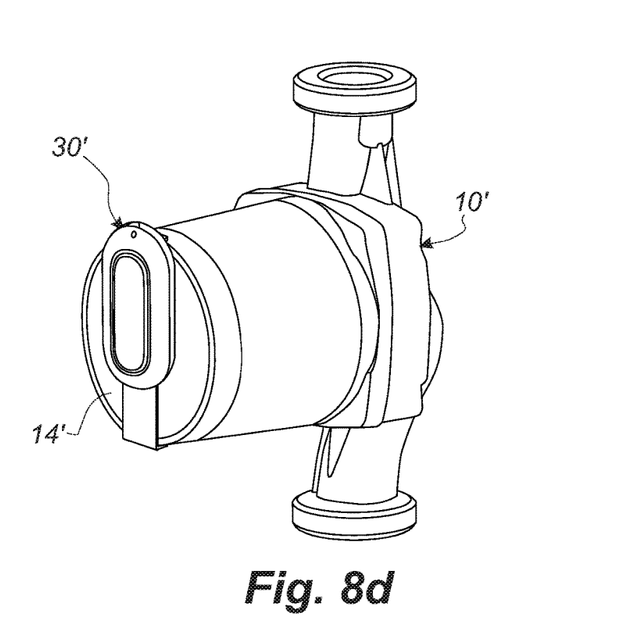

The electronic converter unit 30' may further be designed such that a small part 35' of the unit 30' protrudes beyond the housing of the pump unit 10, when the electronic converter unit 30' is arranged on the front end 14 of the pump unit, as shown in FIG. 8d. This may for instance be achieved by letting the second mechanical fastener 32" being spaced slightly from an end face of the unit 30'. An antenna may be arranged in the protruding part 35' of the electronic converter unit 30', which may in some instances provide a stronger signal to the handheld communication device.

Figure 4:
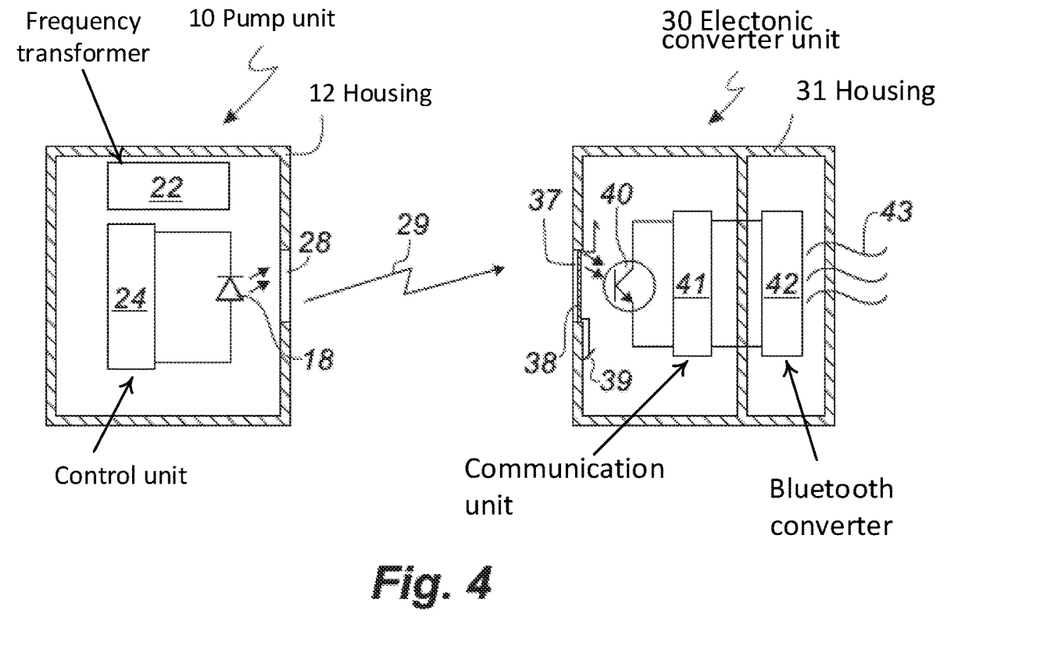
FIG. 4 shows a schematic drawing of components of the electronic converter unit and the pump unit.
Figure 5:
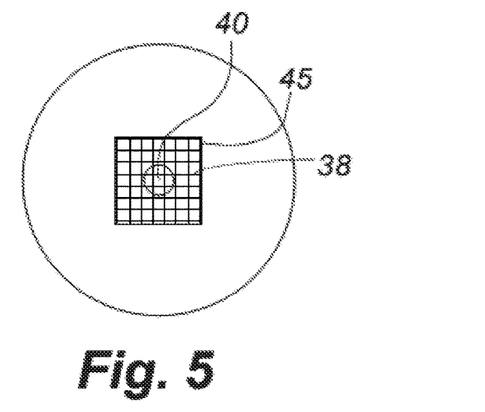
FIG. 5 shows a schematic drawing of an aperture provided in a housing of the electronic converter unit.

FIG. 4 shows a schematic drawing of components of the pump unit 10 and the electronic converter unit 30, and FIG. 5 shows a part of the side of the electronic converter unit 30, which faces towards the housing 12 of the pump unit 10, when the electronic converter unit 30 is attached to the pump unit 10. The electronic converter unit may for instance correspond to the embodiment of FIG. 2 or FIG. 8.

As previously mentioned, the housing 12 of the pump unit comprises a control circuitry. The control circuitry comprises a control unit 24, which controls the emission of light from the light source 18, and which may be instructed to read out the operational status of the pump unit 10 via optical signals 29 or optical data transmitted from the light source 18. The light source 18, e.g. in form of one or more photo diodes may be accessible from the housing 12 of the pump unit 10, or it may be arranged behind a window 28.

The control circuitry further comprises a switch-mode converter or power supply, which comprises a frequency transformer 22. The switch-mode converter may for instance be operating in the frequency range of 100 kHz to 200 kHz and may be the source of electrical noise from the pump unit 10.

The housing 31 of the electronic converter unit 30 also comprises an electronic circuitry. The electronic circuitry comprises a photo detector 40, e.g. in form of a photo transistor or photo diode, which is connected to a communication unit 41 for detecting and converting the detected optical signal 29. The electronic circuitry further comprises a Bluetooth® unit 42, such that the detected signal may be transmitted as a wireless signal transmission 43 to the external communication device 50 via the Bluetooth® protocol. The transmitter of the electronic converter unit 30 may also use other conventional communication protocols, such as GSM, CDMA, 3G, 4G, or infrared light.

In order to ensure a longer reach of the wireless signal 43, an electronic amplifier 44 increases signal strength. This is relevant for the application of the invention in buildings, where walls separate the electronic converter unit 30 from the handheld device 50. Signal 43 should also reach the handheld device of the service technician from the cellar, even if he is on the third floor. An energy supply 46, preferably in the form of batteries, are included in the electronic converter unit 30. They supply 40, 41, 42 and 44 with electrical energy. In order to save energy, the energy supply 46 in FIG. 4 is shut off, or lowered in the level of supply energy, if detector 40 does not receive an optical signal, or if a transmission-idle-time-limit has been reached, e.g. 30 seconds. In one embodiment, instead of using batteries, energy can be supplied by the pump unit itself to the electronic converter unit. This can be achieved by wireless and inductive energy transfer from a coil placed behind the front end 14, said coil then inductively energises a coil placed inside the housing 31 of electronic converter unit 30.

The photo detector 40 is arranged behind an aperture 45 in the housing 31 of the electronic converter unit 30. The aperture may be provided with an optical transparent layer 37, e.g. made of glass, artificial glass, or plastic, and further a conductive layer 38, which is provided with an aperture to allow light to enter and be detected by the photo detector 40. The aperture may also comprise a condensing lens or a Fresnel lens in order to ensure that the light from the pump unit 10 reaches the photo detector 40. The conductive layer 38 is preferably formed as a mesh structure or an opaque layer with an aperture, such that the conductive layer 38 provides a Faraday cage like mesh structure, which allows light to enter but not electrical noise or interference. The Bluetooth® unit 42 is arranged outside the Faraday cage so that it is able to send the converted signal to the external communication device 50.

The optical transparent layer 37 and the conductive layer 38 may be provided as two separate layers as shown in FIG. 4, or they may be integrated into a single layer.

The aperture 45 is shown as being substantially square. However, it may be of any suitable shape, e.g. being round.

The conductive layer 38 is preferably connected to ground 39. The internal part of the housing 31 of the electronic converter device 30 may also be covered by an electric conductive layer, e.g. also in form of a mesh structure. The conductive layer or mesh structure 38 may then be grounded to the conductive layer of the housing, which provides a large ground plane.

The conductive material of the conductive layer and the interior of the housing 31 may for instance be made of metal, such as copper or brass, but any conductive material is in principle applicable.

The electronic circuitry is preferably also connected to ground. The conductive layer 38 and the electronic circuitry may be connected to a common ground or to separate grounds.

Figure 6A:
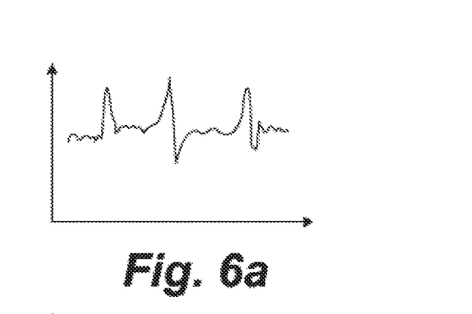
FIGS. 6a and 6b show detected signals without and with noise reduction, respectively.
Figure 6B:
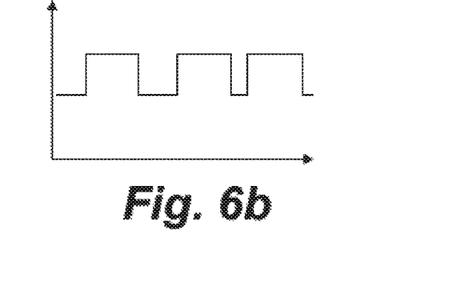

FIGS. 6a and 6b illustrate detected signals without and without the mesh structure provided in the aperture 45, respectively. As seen in FIG. 6a, the detected signal is very noisy, if the aperture is not provided with an electrical conductive mesh structure. Thus, the noise may influence the conversion of the detected optical signal 29 to the radio signal transmission 43. However, by utilising a mesh structure in the aperture 45, the electrical noise may be removed and the optical readout may be converted by detector 40, e.g. to clear binary signal as shown in FIG. 6b.

Figure 7:
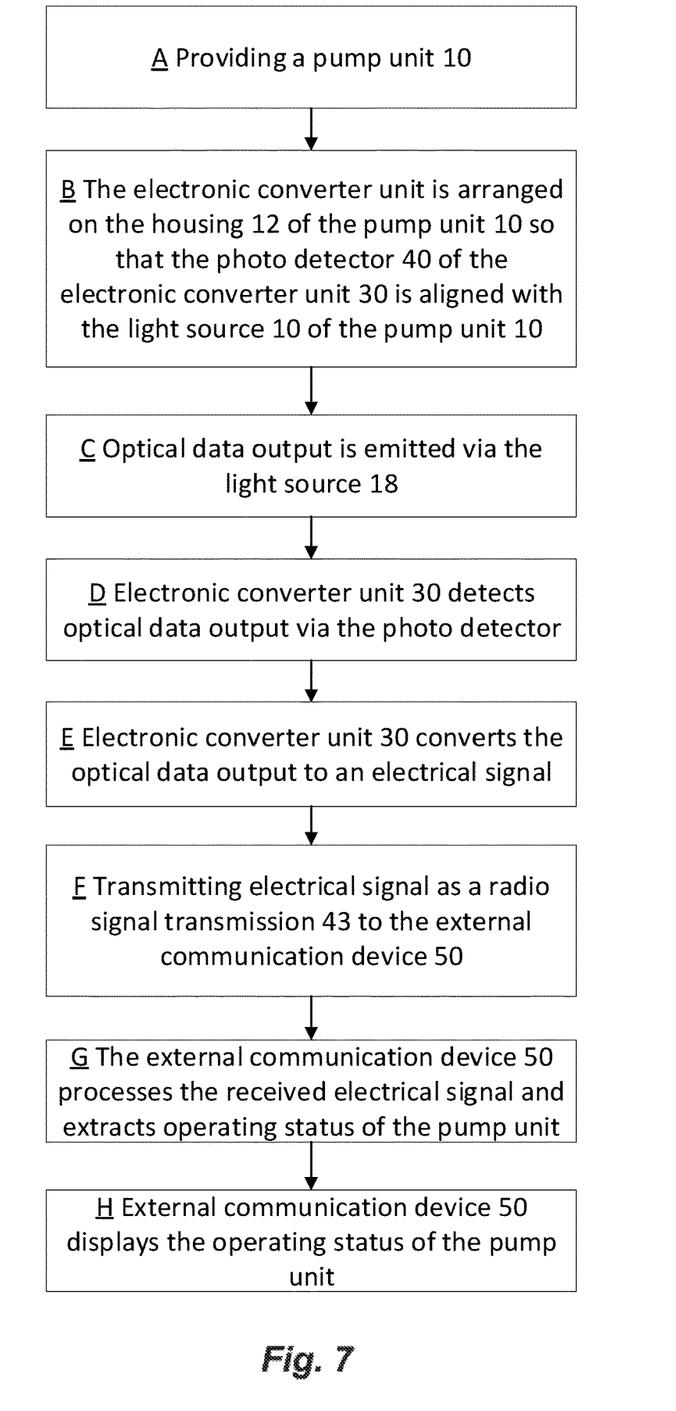
FIG. 7 illustrates the steps in a method for checking the operating status of a pump unit on an external communication unit.

FIG. 7 illustrates the steps in a method for checking the operating status of the pump unit 10 on the external communication unit 50.

In a first step (A), the pump unit 10 is provided. Then in a second step (B), the electronic converter unit 30 for converting an optical data output from the light source of the pump unit to an electrical data signal is arranged on the housing 12 of the pump unit 10 so that the photo detector 40 of the electronic converter unit 30 is aligned with the light source 18 of the pump unit 10.

In a third step (C), the pump unit 10 is brought to a state, where an optical data output is emitted via the light source 18 in order read out the operating status of the pump unit 10.

In a fourth step (D), the electronic converter unit 30 detects the optical data output via the photo detector 40. In a fifth step (E), the electronic converter unit 30 converts the optical data output to an electrical data signal, which in a sixth step (F) is transmitted as a radio signal transmission 43 to the external communication device 50.

In a seventh step (G), the external communication device 50 processes the received electrical data signal via an app installed and running on the external communication device 50 and extracts the operating status of the pump unit. In an eighth step (H), the external communication device 50 displays the operating status of the pump unit and the display 52 of the external communication device 50.

In the previous, the system and method according to the invention have been described in relation to embodiments for reading out the operational status of the pump unit 10. However, the pump unit 10 may further be provided with a receiver for receiving instructions from the electronic converter unit 30, and the electronic converter unit 30 may be provided with a transmitter for transmitting instructions to the pump unit. The pump unit may in one embodiment be equipped with a CCD device on the front end 14, and electronic processing devices inside the pump unit would then perform digital image processing. In a more cost efficient version, a photo detector like detector 40 may be placed in front end 14 instead. Accordingly, the electronic converter unit 30 may provide two-way communication and act as an intermediate communication device, which enables the external communication device 50 to receive and transmit information between the external communication device 50 and the pump unit 10 and inter alia to control the pump unit 10. This provides a highly secure system, where a user can only access and control the working parameters of the pump unit 10, if the user both have an electronic converter unit according to the invention and e.g. a smart phone 50 with the correct app installed on the smart phone 50.

In one embodiment, the invention is used in a method for balancing the fluid flow and/or fluid pressure in the pipes of a heating system, such as a system with a plurality of parallel radiators, or parallel heating tubes for floor heating. In a known manner, the service technician detects an unbalance in the system, and adjusts for example the flow through a radiator by adjusting a valve on the radiator. In this way a radiator, which receives too high flow, experiences a reduced flow due to the adjustment of the valve, and the other radiator(s) receive more flow. Balancing is a way to obtain better heating comfort for the homeowner, and a way to reduce energy consumption. When performing a balancing of a heating system, the service technician can advantageously use the current invention. When commissioning the heating system in a house, or when later performing maintenance on the system, the service technician places the electronic converter unit 30 on the front end 14 of the pump. He initializes the converter unit 30 to read out the flow and/or pressure through the pump and leaves the site of the pump and goes to the radiators, e.g. on the 3$^{rd}$ floor of the house. When adjusting the valve of a radiator the adjusted value of flow and/or pressure can be read in the display of the handheld device 50. Based on this information the service technician can perform an easy balancing of the system. Preferably, the handheld device includes an app, which is dedicated to assist the service technician in balancing heating systems. The dedicated balancing app instructs the service technician about the steps to be taken when performing balancing and also includes calculation algorithms for calculating optimum heating and energy conditions. In a first step, the service technician informs the app about the number of radiators. In a second step he closes all radiators, i.e. shuts off the valves, except for one radiator. The electronic converter unit 30 then reads the flow and/or pressure through the pump, and informs the handheld device, or more precisely the app of the handheld device. The app stores this information. In the next step, the radiator just measured is closed, and another radiator is opened. The electronic converter unit makes a new reading and sends this to the app in the handheld device. This closing-opening process is repeated until all radiators have been measured, and the most inefficient radiators have been identified by the app. The app will then inform the service technician about which radiator is to be adjusted. Instead of sending information about flow or pressure, information about the electrical current of the pump can also be sent.

The invention has been described with reference to advantageous embodiments. However, the scope of the invention is not limited to the illustrated embodiments, and alterations and modifications can be carried out without deviating from the scope of the invention, which is defined by the following claims. The invention has for instance been described with reference to embodiments based on an optical readout of the operating status of the pump unit. However, it is recognised that the communication may also be based on other proximity sensor systems. The communication between the pump unit and the electronic converter unit may for instance be based on RFID or NFC technology. The communication between the pump unit ant the electronic converter unit may also be based on sound signals or other suitable signals.

| Reference Numerals | |
|---|---|
| 10 | Pump unit |
| 12 | Housing/terminal box |
| 14 | Front end/display |
| 16 | Display units |
| 18 | Light source/diode |
| 20, 21 | Pipe flanges |
| 22 | Frequency transformer |
| 24 | Control unit |
| 28 | Window |
| 29 | Light/Optical signal/optical data |
| 30 | Electronic converter unit |
| 31 | Housing |
| 32 | Fasteners |
| 34 | Display/Indicator |
| 36 | Bluetooth |
| 37 | Optical transparent layer |
| 38 | Mesh structure/conductive layer |
| 39 | Ground |
| 40 | Photo detector |
| 41 | Communication unit |
| 42 | Bluetooth converter |
| 43 | Radio signal transmission |
| 45 | Aperture |
| 50 | External communication device/smart phone |
| 52 | Display |
| 100 | System for checking the operating status of a pump unit |

The invention claimed is:

1. An electronic converter unit for a pump unit, wherein the pump unit includes a housing, which comprises a signal generator for emitting a signal, wherein the electronic converter unit comprises:
an emitted signal sensor detecting the signal emitted by the signal generator of the pump unit, wherein the electronic converter unit is adapted to be detachably coupled to the pump unit and the electronic converter unit further comprises:
an electronic converter circuit converting said detected signal to an electrical signal comprising an operating status; and
a transmitter transmitting the electrical signal to an external communication unit, wherein the electronic converter unit is adapted to wirelessly transmit the electrical signal as infrared or as a radio signal, wherein the external communication unit comprises a handheld device, wherein the operating status is received by the handheld device from the electronic converter unit, and the operating status is displayed on the handheld device, wherein the operating status is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

2. The electronic converter unit according to claim 1, wherein the electrical signal is transmitted using a communication protocol chosen from a group comprising: GSM, CDMA, 3G, 4G and Bluetooth®.

3. The electronic converter unit according to claim 1, further comprising an electronic signal amplification circuit, and a switch shutting off the electronic converter unit or lowering energy consumption of the electronic converter unit, if a communication idle-time-limit has been reached.

4. The system according to claim 1, wherein the app in the handheld device processes the electrical signal received from the electronic converter unit.

5. The electronic converter unit according to claim 1, wherein the signal generator is a light source, and wherein the sensor detecting the signal emitted by the signal generator is a photo detector for measuring a light emitted from the light source of the pump unit, and wherein the electronic converter circuit is adapted to convert optical signals to electrical signals.

6. The electronic converter unit according to claim 5, wherein the electronic converter unit is provided with a housing having an aperture, and wherein the photo detector is arranged within the housing behind the aperture.

7. The electronic converter unit according to claim 6, wherein the aperture is provided with an optical transparent cover comprised of glass, artificial glass or plastic.

8. The electronic converter unit according to claim 6, wherein the photo detector is arranged in a range of 0.5 mm to 5 mm from the aperture.

9. The electronic converter unit according to claim 6, wherein the aperture is further provided with a sheet or layer of conductive material, the sheet or layer having a number of apertures.

10. The electronic converter unit according to claim 9, wherein the sheet or layer of conductive material is a mesh structure.

11. The electronic converter unit according to claim 10, wherein a mesh size of the mesh structure is adjusted to a pitch size being larger than a wavelength of the emitted light but smaller than a wavelength of electric noise emitted from the electronic converter unit.

12. The electronic converter unit according to claim 9, wherein the conductive material is a metal comprised of copper or brass.

13. The electronic converter unit according to claim 9, wherein:
the aperture is provided with an optical transparent cover; and
the conductive material is integrated into the optical transparent cover.

14. The electronic converter unit according to claim 9, wherein:
the aperture is provided with an optical transparent cover; and
the optical transparent cover and the sheet or layer of conductive material are provided as two separate layers or as an in-molded or embedded mesh within a transparent cover.

15. The electronic converter unit according to claim 9, wherein the conductive material is connected to electrical ground.

16. The electronic converter unit according to claim 9, wherein the housing of the electronic converter unit is covered by a conductive material and the sheet or layer of conductive material is grounded to said housing of the electronic converter unit.

17. The electronic converter unit according to claim 6, further comprising an attachment attaching the electronic converter unit to the housing of the pump unit.

18. The electronic converter unit according to claim 7, wherein the attachment is chosen from a group of: mechanical fasteners, magnetic fasteners, and adhesive fasteners.

19. The electronic converter unit according to claim 7, wherein the attachment is adapted to align the aperture of the electronic converter unit with the light source of the pump unit.

20. A kit of parts comprising a pump unit and an electronic converter unit comprising:
an emitted signal sensor detecting a signal emitted by a signal generator of the pump unit, wherein the electronic converter unit is adapted to be detachably coupled to the pump unit;
an electronic converter circuit converting said detected signal to an electrical signal comprising an operating status; and
a transmitter transmitting the electrical signal to an external communication unit, wherein the electronic converter unit is adapted to wirelessly transmit the electrical signal as infrared or as a radio signal, wherein the pump unit comprises a housing and said signal generator comprising a light source, for emitting said signal comprising light and to display or communicate the operating status of the pump unit, and wherein the electronic converter unit is adapted to be retrofitted to an external part of the housing of the pump unit, wherein the external communication unit comprises a handheld device, wherein the operating status is received by the handheld device from the electronic converter unit, and the operating status is displayed on the handheld device, wherein the operating status is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

21. The kit of parts according to claim 20, wherein the pump unit comprises an electric motor and at least one rotating shaft.

22. The kit of parts according to claim 20, wherein the pump unit is further provided with a receiver for receiving instructions from the electronic converter unit, and wherein the electronic converter unit is provided with a transmitter for transmitting instructions to the pump unit.

23. The kit of parts according to claim 20, wherein the pump unit comprises an electronic switch-mode converter.

24. A system for checking an operating status of a pump unit, wherein the system comprises a pump unit, an external communication unit, and an electronic converter circuit unit, wherein:
the pump unit comprises a housing and a signal generator, for emitting a signal using light, and further to display the operating status of the pump unit;
the electronic converter circuit unit is adapted to be retrofitted to an external part of the housing of the pump unit and adapted to convert said signal from the pump unit to an electrical signal comprising the operating status and to transmit the electrical signal to the external communication unit;

the external communication unit is adapted to receive and process electrical signals sent from the electronic converter circuit unit so as to display the operating status of the pump unit on a display of the external communication unit;

the external communication unit comprises a handheld device;

the operating status received from the electronic converter circuit unit and displayed on the handheld device is chosen from a group of: a flow information, a speed information, an electrical current information, a pressure information relating to a liquid flowing in pipes connected to the pump unit, a temperature of the liquid and a rotational speed of a shaft of the pump unit; and said operating status is used by an app in the handheld device to guide a service technician to balance liquid flow or pressure in a heating system comprising multiple radiators or heat radiating pipes.

25. The system according to claim 24, wherein the external communication unit is further adapted to control the pump unit via the electronic converter circuit unit.

26. A method for checking an operating status of a pump unit with an external communication unit, wherein the method comprises steps of:

providing a pump unit comprising a housing and a signal generator for emitting light to display the operating status of the pump unit;

arranging an electronic converter circuit unit for converting an optical data output from the signal generator of the pump unit to an electrical data signal comprising the operating status so that a photo detector of the electronic converter circuit unit is aligned with the signal generator of the pump unit;

with the pump unit, emitting the optical data output via the signal generator in order to display the operating status of the pump unit;

with the electronic converter circuit unit, detecting the optical data output via the photo detector;

with the electronic converter circuit unit, converting the detected optical data output to the electrical data signal;

with the electronic converter circuit unit, transmitting the electrical data signal to the external communication unit;

with the external communication unit, receiving and processing the electrical data signal in order to extract the operating status of the pump unit; and with the external communication unit, displaying the operating status of the pump unit on a display of the external communication unit, wherein the external communication unit comprises a handheld device, wherein the operating status received from the electronic converter circuit unit and displayed on the handheld device is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

27. The method according to claim 26, further comprising controlling, the pump unit in a subsequent step by:

the external communication unit sending instructions to the pump unit, and the pump unit setting driving conditions of the pump unit based on said instructions.

28. The method according to claim 27, wherein the instructions are sent to the electronic converter circuit unit, which the electronic converter circuit unit converts the instructions and emits the converted instructions via a light source of the electronic converter circuit unit, which in turn is received by a photo detector on the pump unit.

29. An electronic converter unit for a pump unit, wherein the pump unit includes a housing and comprises a communication system for transmitting an operating status of the pump unit, wherein the communication system comprises an RFID or near-field communication (NFC) unit, wherein the electronic converter unit is adapted to be retrofitted to an external part of the housing of the pump unit and the electronic converter unit comprises:

a RFID or near-field communication receiver, a converter unit for converting RFID or NFC signals to electrical signals comprising the operating status, and a transmitter transmitting the electrical signals to an external communication unit, wherein the external communication unit comprises a handheld device, wherein the operating status is received by the handheld device from the electronic converter unit, and the operating status is displayed on the handheld device, wherein the operating status is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

30. A system for checking an operating status of a pump unit, wherein the system comprises a pump unit, an external communication unit, and an electronic converter unit, wherein the pump unit comprises a housing and a communication system for transmitting the operating status of the pump unit, wherein the communication system comprises an RFID or near-field communication (NFC) unit, and wherein the electronic converter unit is adapted to be retrofitted to an external part of the housing of the pump unit and adapted to convert RFID or NFC signals from the pump unit to electrical signals comprising the operating status and to transmit the electrical signals to the external communication unit, and wherein the external communication unit is adapted to receive and process electrical signals sent from the electronic converter unit so as to display the operating status of the pump unit on a display of the external communication unit, wherein the external communication unit comprises a handheld device, wherein the operating status received from the electronic converter unit and displayed on the handheld device is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

31. A pump unit, comprising a housing and a signal generator for emitting a signal comprising an operating status, wherein the pump unit via said signal generator is adapted to communicate with an electronic converter unit, which is detachably coupled to the housing of the pump unit, wherein an external communication device comprises a handheld device, wherein the operating status is received by the handheld device from the electronic converter unit, and the operating status is displayed on the handheld device, wherein the operating status is chosen from a group of: a flow information, a speed information, an electrical current information, a pressure information relating to a liquid flowing in pipes connected to the pump unit, a temperature of the liquid and a rotational speed of a shaft of the pump unit, and wherein said operating status is used by an app in the handheld device to guide a service technician to balance liquid flow or pressure in a heating system comprising multiple radiators or heat radiating pipes.

32. A pump unit according to claim 31, wherein the pump unit is adapted to communicate with the electronic converter unit via said signal generator in near field communication only.

* * * * *